United States Patent
Lu et al.

(10) Patent No.: US 10,181,810 B2
(45) Date of Patent: *Jan. 15, 2019

(54) DETERMINING MOTOR POSITION WITH COMPLEMENTARY DRIVING AND DETECTION AND CURRENT INJECTION

(71) Applicant: ALLEGRO MICROSYSTEMS, LLC, Manchester, NH (US)

(72) Inventors: Yisong Lu, Shrewsbury, MA (US); Lyndon Ambruson, Warren, MA (US)

(73) Assignee: ALLEGRO MICROSYSTEMS, LLC, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/184,159

(22) Filed: Jun. 16, 2016

(65) Prior Publication Data
US 2017/0366120 A1    Dec. 21, 2017

(51) Int. Cl.
| | |
|---|---|
| *H02P 6/22* | (2006.01) |
| *H02P 6/18* | (2016.01) |
| *H02P 6/185* | (2016.01) |
| *H02P 6/20* | (2016.01) |

(52) U.S. Cl.
CPC .............. *H02P 6/186* (2013.01); *H02P 6/185* (2013.01); *H02P 6/20* (2013.01)

(58) Field of Classification Search
CPC .......... H02P 6/185; H02P 6/22; H02P 21/146; H02P 21/0053; H02P 6/20; H02P 6/14; H02P 6/182
USPC ............. 318/400.01, 400.32, 400.33, 400.34
See application file for complete search history.

(56) References Cited

U.S. PATENT DOCUMENTS

| | | | |
|---|---|---|---|
| 6,218,795 B1 | 4/2001 | Syukuri | |
| 6,650,082 B1 * | 11/2003 | Du | H02P 6/22 318/701 |
| 6,703,805 B2 * | 3/2004 | Griffitts | H02P 6/18 318/459 |
| 7,015,664 B2 * | 3/2006 | Coles | H02P 6/185 318/400.01 |
| 7,026,774 B2 * | 4/2006 | Inaba | H02P 6/185 318/400.33 |

(Continued)

FOREIGN PATENT DOCUMENTS

| | | |
|---|---|---|
| EP | 0 251 785 A2 | 1/1988 |
| EP | 0 420 501 A1 | 4/1991 |

OTHER PUBLICATIONS

U.S. Appl. No. 15/184,163, filed Jun. 16, 2016, Lu et al.

(Continued)

*Primary Examiner* — Rina Duda
(74) *Attorney, Agent, or Firm* — Daly, Crowley Mofford & Durkee, LLP

(57) ABSTRACT

Methods and apparatus for determining a position of a rotor in motor, such as a three-phase motor by determining first and second ones of sectors in which a first one of the magnetic poles of the rotor may be positioned by driving phase pairs with complementary signals and examining a voltage of a floating one of the phases. Embodiments can further include driving first and second currents towards the first and second ones of the sectors and analyzing a time for each of the first and second currents to reach a threshold to identify which of the first and second ones of the sectors is aligned with the first one of the magnetic poles of the rotor.

23 Claims, 15 Drawing Sheets

(56) References Cited

U.S. PATENT DOCUMENTS

| | | |
|---|---|---|
| 7,256,564 B2 * | 8/2007 | MacKay ................. H02P 6/182 |
| | | 318/268 |
| 8,089,192 B2 | 1/2012 | Li et al. |
| 8,729,841 B2 | 5/2014 | Reynolds et al. |
| 8,917,043 B2 | 12/2014 | Reynolds et al. |
| 8,917,044 B2 | 12/2014 | Reynolds et al. |
| 9,172,320 B2 | 10/2015 | Reynolds et al. |
| 9,281,769 B2 | 3/2016 | Reynolds et al. |
| 2004/0075407 A1 | 4/2004 | Ohiwa et al. |
| 2007/0132415 A1 | 6/2007 | Patel et al. |
| 2009/0108783 A1 * | 4/2009 | Paintz ...................... H02P 6/15 |
| | | 318/400.33 |
| 2010/0141192 A1 | 6/2010 | Paintz et al. |
| 2014/0232311 A1 * | 8/2014 | Hill ......................... H02P 6/186 |
| | | 318/400.33 |
| 2014/0340008 A1 | 11/2014 | Reynolds et al. |

OTHER PUBLICATIONS

U.S. Non-Final Office Action dated Sep. 7, 2017 for U.S. Appl. No. 15/184,163; 11 pages.

U.S. Final Office Action dated Jan. 9, 2018 corresponding to U.S. Appl. No. 15/184,163; 9 Pages.

Notice of Allowance dated Sep. 18, 2018, for U.S. Appl. No. 15/184,163; 10 Pages.

Appeal Brief in Response to U.S. Final Office Action dated Jan. 9, 2018 for U.S. Appl. No. 15/184,163; Appeal Brief filed Jun. 28, 2018; 13 pages.

International Search Report and Written Opinion dated Nov. 8, 2017; for PCT/US2017/034923; 12 pages.

Response filed Nov. 30, 2017 to the Office Action dated Sep. 7, 2017; for U.S. Appl. No. 15/184,163; 10 pages.

\* cited by examiner

Equivalent Circuit

Driving Circuit

DETERMINING MOTOR POSITION WITH COMPLEMENTARY DRIVING AND DETECTION AND CURRENT INJECTION

BACKGROUND

Circuits to control and drive brushless DC (BLDC) electric motors are known. As is also known, it may be desirable to know the position of the motor at startup. Conventional BLDC motor control techniques may employ BEMF (back emf) information for position estimation, however, BEMF information is not available at zero speed, for example, at motor startup. Another conventional startup technique is to drive the motor in open loop without position estimation (e.g., align and go for example), which may cause reverse rotation during startup. In addition, this technique may increase startup time if a relatively conservative startup profile is chosen, or, render motor startup unreliable if an aggressive startup profile is chosen. One known alternative technique for motor startup is referred to as Initial Position Detect (IPD), which is commonly used in hard disk drives, for example. Current is injected into six combinations of the three stator phases, where one out of the six combinations has the least inductance, which is indicative of the North pole of the rotor. However, conventional IPD techniques are noisy in practice due to the torque generated during current injection. In addition, accuracy may be relatively poor because six relatively close signals are compared.

SUMMARY

Embodiments of the invention provide methods and apparatus for detecting motor position at zero, or low, motor speed, using complementary driving and detect (CDD) signals.

Embodiments may be suited for three-phase BLDC motors. An inductance difference is detected based upon the motor position after which inductor saturation is detected from magnet polarity.

In embodiments, motor position in relation to a magnet can be determined at zero torque within a given range, such as thirty degrees. Conventional motor position techniques may have a significantly larger range, such as sixty degrees. In one embodiment, complementary driving and detect—polar axis current injection (CDD-PACI) provides motor position detection. In another embodiment, complementary driving and detect—slight move (CDD-slight move) provides motor position.

In embodiments, acoustic noise and vibration are significantly reduced as compared with conventional motor position detection techniques since high frequency signals, e.g., 25 kHz, are used. In addition, the relatively high frequency signals reduce the time needed to detect motor position.

In one aspect of the invention, a method of determining a position of a rotor in a three-phase motor having phase A, phase B, and phase C, comprises: determining first and second ones of sectors in which a first one of the magnetic poles of the rotor may be positioned, wherein the first and second ones of the sectors are oppositely located, by driving phase pairs A-B, A-C, and B-C with complementary signals and examining a voltage of a floating one of the phases; and driving first and second currents towards the first and second ones of the sectors and analyzing a time for each of the first and second currents to reach a threshold to identify which of the first and second ones of the sectors is aligned with the first one of the magnetic poles of the rotor.

The method can further include one or more of the following features: the time corresponds to a level of inductance saturation, the motor comprises BLDC motor, the sectors comprise twelve sectors, the first and second ones of the sectors span about thirty degrees, driving phase pairs A-B, A-C, and B-C with complementary signals with about fifty percent duty cycles, substantially zero torque is generated by the driving of phase pairs A-B, A-C, and B-C with complementary signals, driving the first current in a first direction and driving the second current in a second direction which is opposite to the first direction, encoding outputs of comparisons of the respective floating voltages and a voltage threshold during the driving of phase pairs A-B, A-C, and B-C with complementary signals, and/or determining the first and second ones of the sectors in which a first one of the magnetic poles of the rotor may be positioned from the encoded outputs.

In another aspect of the invention, a system for determining position of a rotor of a three-phase motor, comprises: a first module to generate drive signals for the three-phase motor; a second module configured to determine first and second ones of sectors in which a first one of the magnetic poles of the rotor may be positioned, wherein the first and second ones of the sectors are oppositely located, by driving phase pairs A-B, A-C, and B-C with complementary signals and examining a voltage of a floating one of the phases; and a third module to generate signals to drive first and second currents towards the first and second ones of the sectors and analyze a time for each of the first and second currents to reach a threshold to identify which of the first and second ones of the sectors is aligned with the first one of the magnetic poles of the rotor.

The system can further include one or more of the following features: the system comprises an IC package having first, second, and third outputs for providing the drive signals for each of the three phases, the time corresponds to a level of inductance saturation, the motor comprises BLDC motor, the sectors comprise twelve sectors, the first and second ones of the sectors span about thirty degrees, the system is further configured to drive phase pairs A-B, A-C, and B-C with complementary signals with about fifty percent duty cycles, substantially zero torque is generated by the driving of phase pairs A-B, A-C, and B-C with complementary signals, the system is further configured to drive the first current in a first direction and driving the second current in a second direction which is opposite to the first direction, the system is further configured to encode outputs of comparisons of the respective floating voltages and a voltage threshold during the driving of phase pairs A-B, A-C, and B-C with complementary signals, and/or the system is further configured to determine the first and second ones of the sectors in which a first one of the magnetic poles of the rotor may be positioned from the encoded outputs.

BRIEF DESCRIPTION OF THE DRAWINGS

The foregoing features of this invention, as well as the invention itself, may be more fully understood from the following description of the drawings in which.

DETAILED DESCRIPTION

Figure 1:
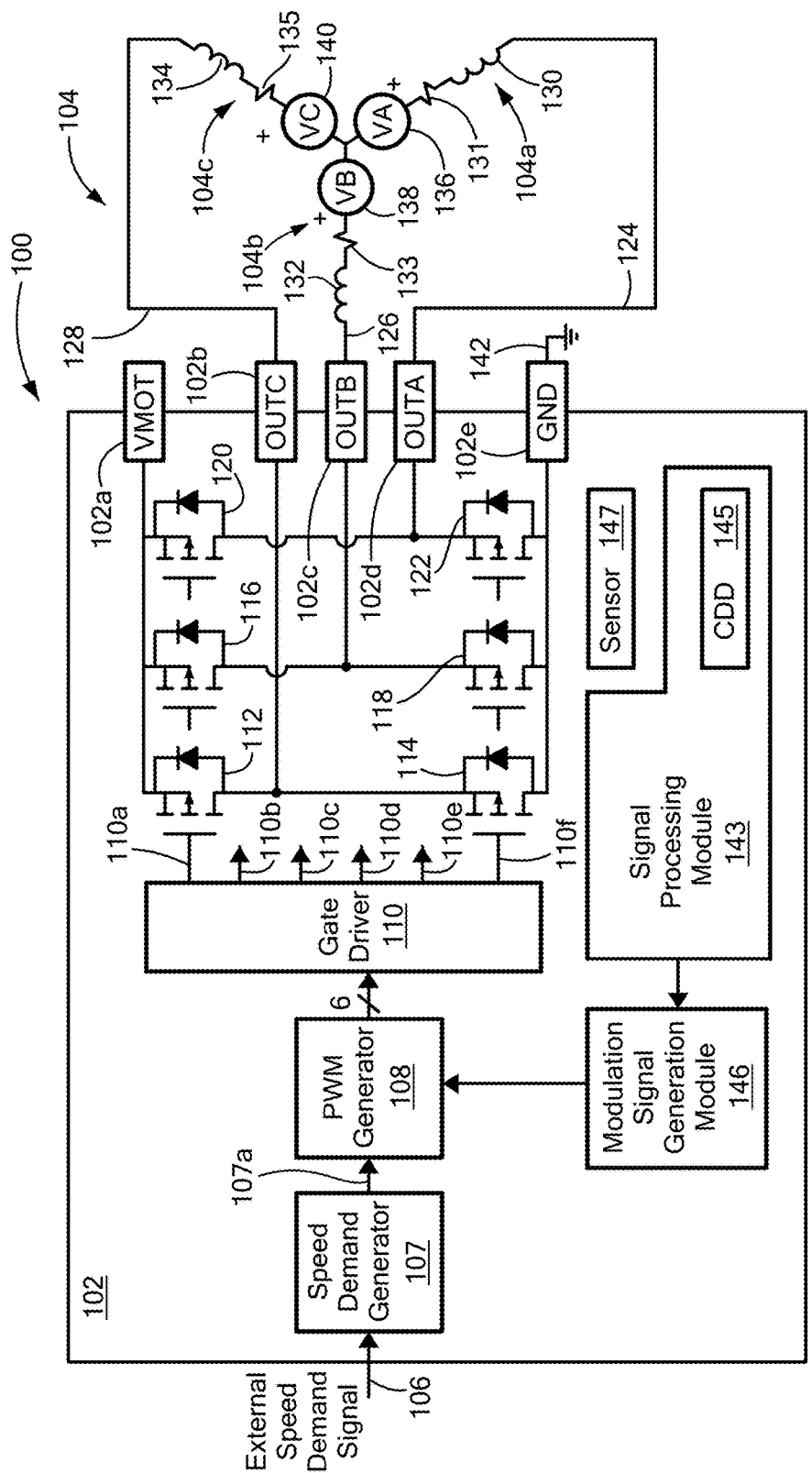
FIG. 1 is a schematic representation of a motor control circuit that can determine motor position in accordance with example embodiments of the invention.
Figure 1A:
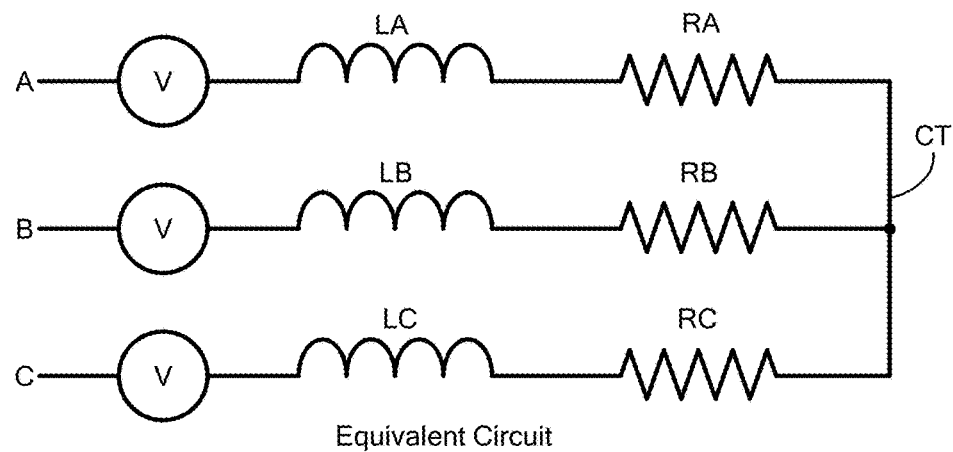
FIG. 1A shows an illustrative equivalent circuit for a portion of a three-phase motor.

FIG. 1 shows an example motor control circuit 102 coupled to an electric motor 104 for providing BLDC motor startup with complementary driving and detect (CDD) in accordance with example embodiments of the invention. The motor 104 is shown to include three windings 104a, 104b, 104c, which can be depicted as a respective equivalent circuit having an inductor in series with a resistor and in series with a back EMF (BEMF) voltage source. For example, the winding A 104a is shown to include an inductor 130 in series with a resistor 131 and in series with a back EMF voltage source VA 136. An example equivalent circuit is described more fully below in conjunction with FIG. 1A.

The motor control circuit 102 includes a speed demand generator 107 coupled to receive an external speed demand signal 106 from outside of the motor control circuit 102. The external speed demand signal 106 can be in one of a variety of formats. In general the external speed demand signal 106 is indicative of a speed of the motor 104 that is requested from outside of the motor control circuit 102.

The speed demand generator 107 is configured to generate a speed demand signal 107a. A pulse width modulation (PWM) generator 108 is coupled to receive the speed demand signal 107a and configured to generate PWM signals having a duty cycle that is controlled by the speed demand signal 107a. The PWM generator 108 is also coupled to receive modulation waveforms from a modulation signal generation module 146. The PWM signals are generated with a modulation characteristic (i.e., a relative time-varying duty cycle) in accordance with the modulation waveforms.

The motor control circuit 102 also includes a gate driver circuit 110 coupled to receive the PWM signals and configured to generate PWM gate drive signals 110a, 110b, 110c, 110d, 110e, 110f to drive six transistors 112, 114, 116, 118, 120, 122 arranged as three half-bridge circuits 112/114, 116/118, 120/122. The six transistors 112, 114, 116, 118, 120, 122 operate in saturation to provide three motor drive signals VoutA, VoutB, VoutC, 124, 126, 128, respectively, at nodes 102d, 102c, 102b, respectively. It is understood that any suitable configuration of switching elements can be used to provide the motor drive signals.

The motor control circuit 102 can also include a signal processing module 143, which can include a CDD module 145, for processing signals from a sensor module 147. As described more fully below, the effects of various applied phase signals can be used to determine the rotor position. For example, the sensor module 147 can be configured to receive back EMF signal(s) (e.g., can be coupled to receive one or more of the motor drive signals 124, 126, 128, which include back EMF signals directly observable at times when the motor windings 104a, 104b, 104c are not being driven and respective winding currents are zero).

Figure 1B:
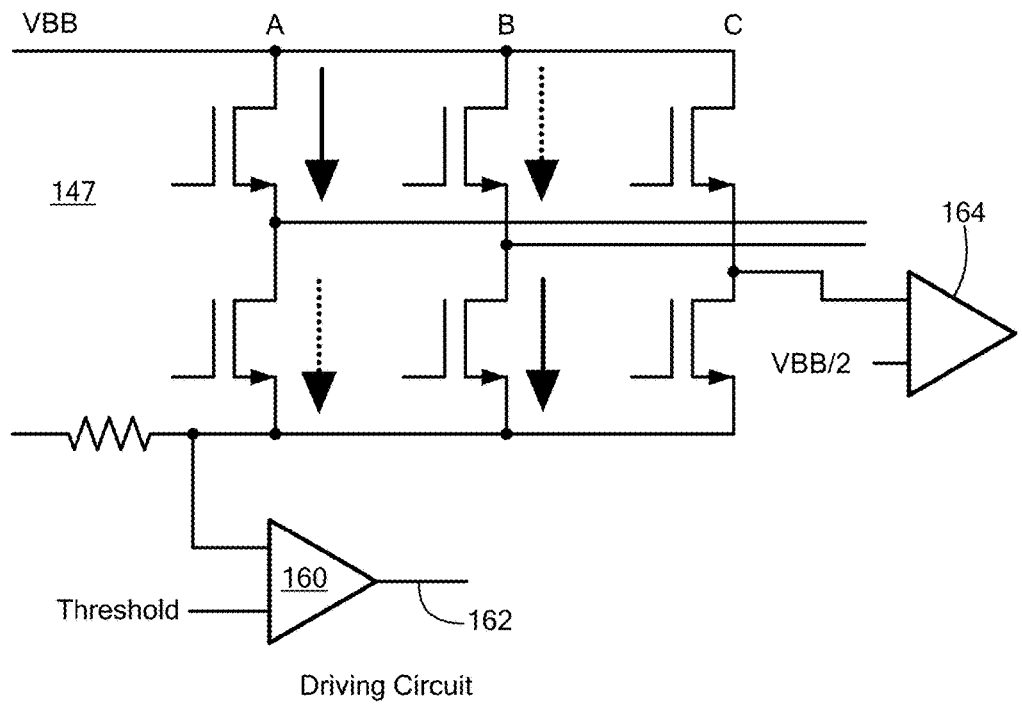
FIG. 1B is a schematic representation of a circuit for measuring phase signals in the circuit of FIG. 1.

FIG. 1B shows an example sensor module 147 having a first comparator 160 having a first input coupled to the switching element pairs and a second input coupled to a threshold value. The first comparator output 162 determines whether the threshold value has been exceeded, as described more fully below. A second comparator 164 has a first input as VBB/2, for example, and a floating one of the phases, as described more fully below.

Referring again to FIG. 1, the signal processing module 143 is configured to generate a position reference signal indicative of a rotational reference position of the motor 104. The modulation signal generation module 146 is coupled to receive the position reference signal and configured to change a phase of the modulation waveforms provided to the PWM generator 108.

The motor control circuit 102 can be coupled to receive a motor voltage VMOT, or simply VM, at a node 102a, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

In one aspect of the invention, the signal processing module 143 controls motor startup including complementary driving and detect (CDD). In embodiments, a position of a rotor in a three-phase motor having phase A, phase B, and phase C can be located to be within first and second ones of a plurality of sectors by successively driving phase pairs A-B, A-C, and B-C with complementary signals and examining a voltage of a floating one of the phases. In one embodiment, CDD-PACI determines motor position. After CDD, once the rotor position is determined to be within one of the two sectors, the system can drive respective first and second phase currents towards the first and second ones of the sectors and analyze a time for each of the first and second currents to reach a threshold to identify which of the first and second ones of the sectors is aligned with the first one of the magnetic poles of the rotor. The drive currents generate magnetic flux such that the permanent magnet flux increases or decreases the current-generated flux depending upon the rotor pole polarity. Thus, inductance saturation is enhanced or impeded which can be used to resolve the rotor position between the two oppositely-located sectors. In embodiments, the time for the drive currents to reach a threshold can be measured to identify the rotor location.

FIG. 1B shows an example equivalent circuit for the windings of a three phase motor. When motor speed is zero, the sum of the BEMFs is zero. The sum of the phase currents is always zero, i.e., $I_A+I_B+I_C=0$. If one drives the system as $U_A=VBB$, $V_B=GND$, and C phase floating ($I_A=-I_B=I$ and $I_C=0$), then $U_C=VBB/2+I*(R_B-R_A)/2+dI/dt*(L_B-L_A)/2$. If $R_A=R_B$ and $L_A=L_B$, then $U_C=VBB/2$. However, if $L_A \neq L_B$, $U_C$ will be either higher or lower than VBB/2. If one chooses current with relatively high frequency and zero average amplitude, then zero average driving torque is generated. Because di/dt associated with the inductor may be significant, the signal of interest can be detected as:

If $L_A>L_B$, $U_C<VBB/2$ if $L_A<L_B$, $U_C>VBB/2$.

Figure 2:
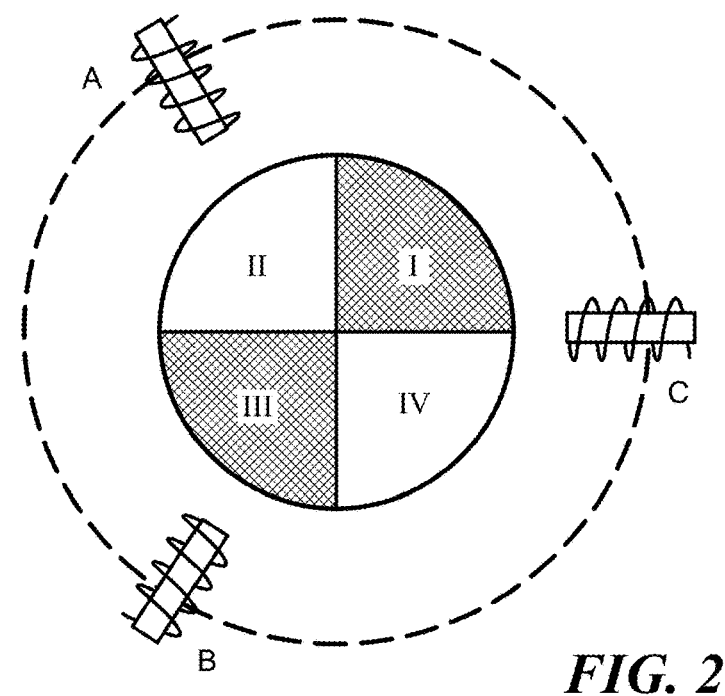
FIG. 2 is a schematic representation of rotor in relation to phases A, B, and C.
Figure 2A:
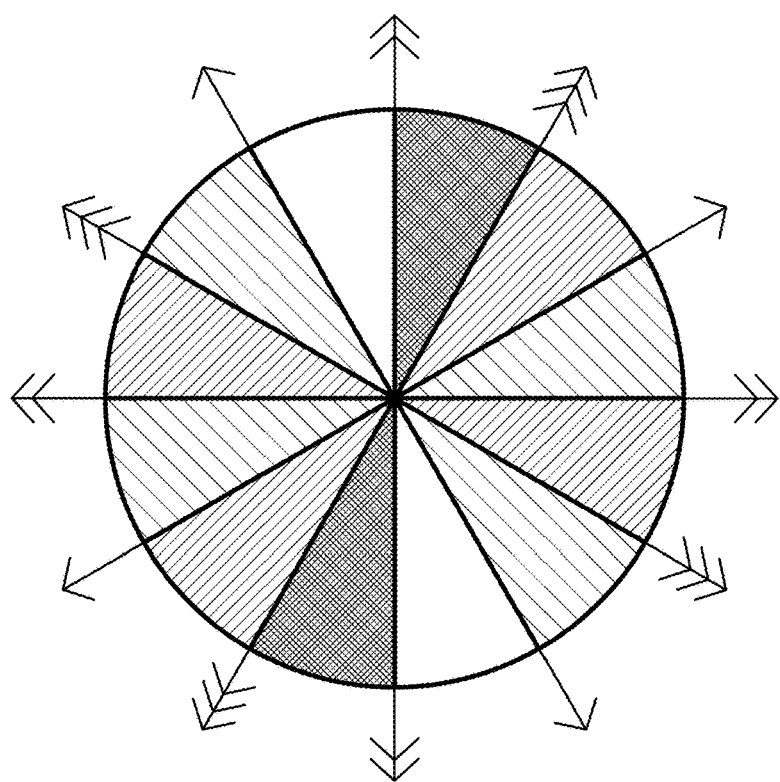
FIG. 2A is a schematic representation of a sectors in which rotor position be located.

FIG. 2 shows a rotor magnet 200 divided into four sectors/quadrants I, II, III, IV, which can have a first pair I, III and a second pair II, IV, in relation to three phases A, B, C. In embodiments, the four quadrants I, II, III, IV are defined by a middle line of phase A and phase B. An inductance difference between phase A and phase B will be successively positive and negative. By measuring a voltage polarity between Uc (floating) and VBB/2, for example, the particular quadrant pair corresponding to the position of the rotor in relation to the magnet can be identified. That is, the position of the rotor can be determined to within quadrant pair I, III or within pair II, IV. In a similar manner, phases A and C and then phases B and C can be driven to determine additional information by detecting a voltage of the floating phase. FIG. 2A shows possible rotor positions divided by a quadrant for each of the three phases resulting in 12 sectors each spanning 30 degrees. That is, quadrants for each of the three phase are offset from each other to provide 12 sectors. The rotor position can be determined to be within one of the 12 sectors, as described more fully below.

Figure 3:
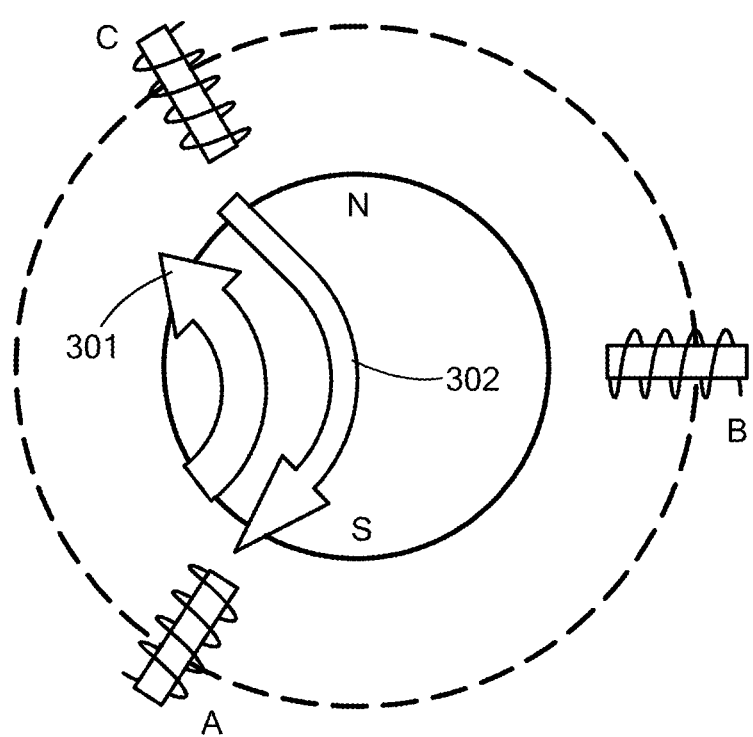
FIG. 3 is a schematic representation of magnet and flux in relation to phases A, B, and C.

FIG. 3 shows an example position of a magnetic pole/rotor in relation to phases A, B, C of the motor. For the illustrated position, the system can drive current from phase A to phase C, which generates magnetic flux 301 from A to C. The permanent magnet flux then increases flux in phases A and C, which results in earlier inductance saturation. The system can drive current from C to phase A, which generates magnetic flux from C to A. The permanent magnet flux then decreases flux 302 in phase A and C, which results in later inductance saturation.

It is understood that magnetic saturation refers to the state reached when an increase in applied winding current cannot increase the magnetization of the material further, so the total magnetic flux density B more or less levels off. Note that it may continue to increase very slowly due to the vacuum permeability. The equivalent inductance is significantly reduced when the current gets close to the saturation current. So, current will increase significantly when approaching the saturation current.

If current is driven from C to A, which generates magnetic flux from C to A, the permanent magnetic flux decreases the flux 302 from C to A. This results in a decrease in the flux from phase A and C, which delays inductance saturation. It is understood that if the rotor polarity is the opposite to that shown, i.e., S pole on top, then the inductance saturation delay/earlier conclusions are also opposite to those described above.

In embodiments, where the rotor position has two possible locations 180 degrees apart, current can be injected into the phases to generate magnetic flux for aligning to the permanent magnetic flux, or to the opposite of the permanent magnetic flux. By detecting the saturation level difference, the two possible locations can be resolved. In embodiments, the time for each of the currents to reach a given threshold can be used to determine the rotor position. It should be noted that these current driving patterns do not generate any significant motor torque.

Figure 4A:
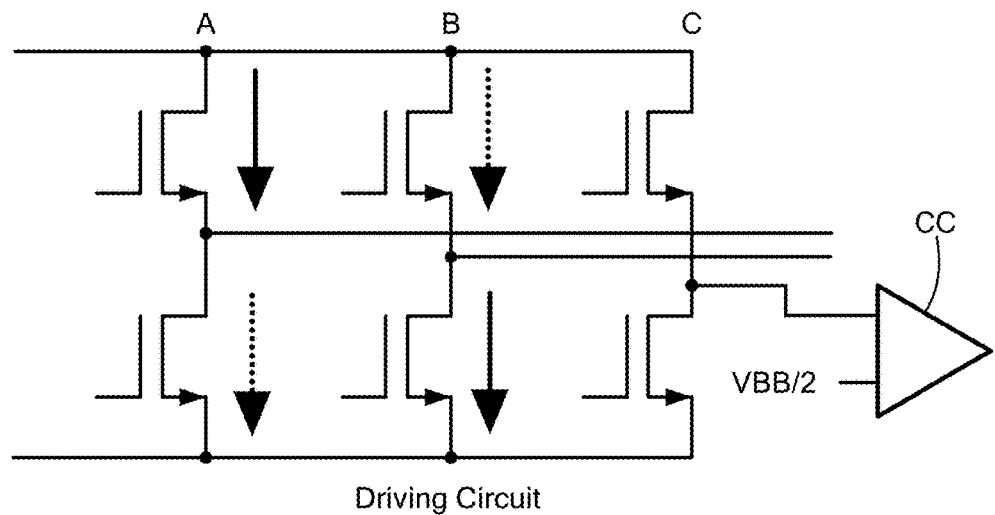
FIG. 4A is a schematic representation of switching elements that can provide phase signals.
Figure 4B:
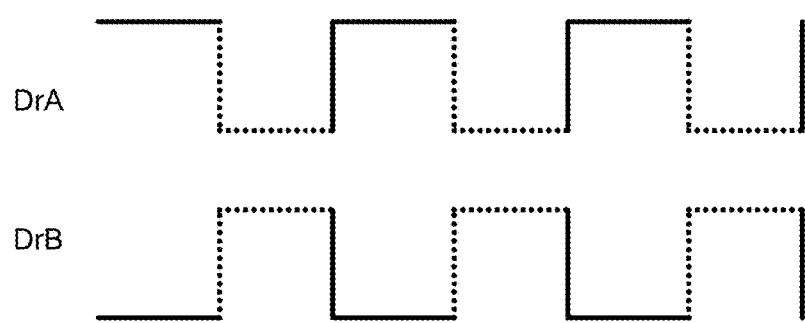
FIG. 4B is a waveform diagram of example signals that can drive phases A and B while phase C is floating.

FIGS. 4A and 4B show an illustrative embodiment of complementary drive and detect (CDD) to implement zero torque position detection in accordance with example embodiments of the invention. FIG. 4A shows a simplified circuit, which can be similar to the switch configuration of FIG. 1, having respective pairs of switching elements for generating signals for phase A, B, and C. It is understood that any suitable configuration of switching elements can be used to generate the phase signals.

As can be seen in FIG. 4B, complementary drive signals DrA, DrB (180 degrees out of phase) with 50% duty cycles are applied to phase A and B. In addition, as shown in FIG. 4A, a comparator CC has a first input as floating phase C and a second input as VBB/2. With this arrangement, the floating phase C voltage can be compared against VBB/2 for locating the rotor position within one of the sectors defined by the quadrant pairs (FIG. 2A). It is understood that the solid lines and dotted lines indicating current flow though the switches and the complementary drive signal DrA, DrB correspond to each other. For example, when drive signal DrA is falling and low, current flows through the lower switch of the phase A switch pair and through the higher switch of the phase B switch pair. Since phase C is floating, there is no current flow resulting from the drive signals DrA, DrB.

By then sequentially driving phases AC and then BC, and measuring the floating phases, the rotor position can be located within two of the twelve sectors. The twelve sectors are formed by from three quadrants offset by 120 degrees, as noted above, where the four quadrants I, II, III, IV of FIG. 2 are defined by a middle line of phase A and phase B, the additional sectors of FIG. 2A are defined by a middle line of phase B and phase C, and a middle line of phase A and C.

Figure 5A:
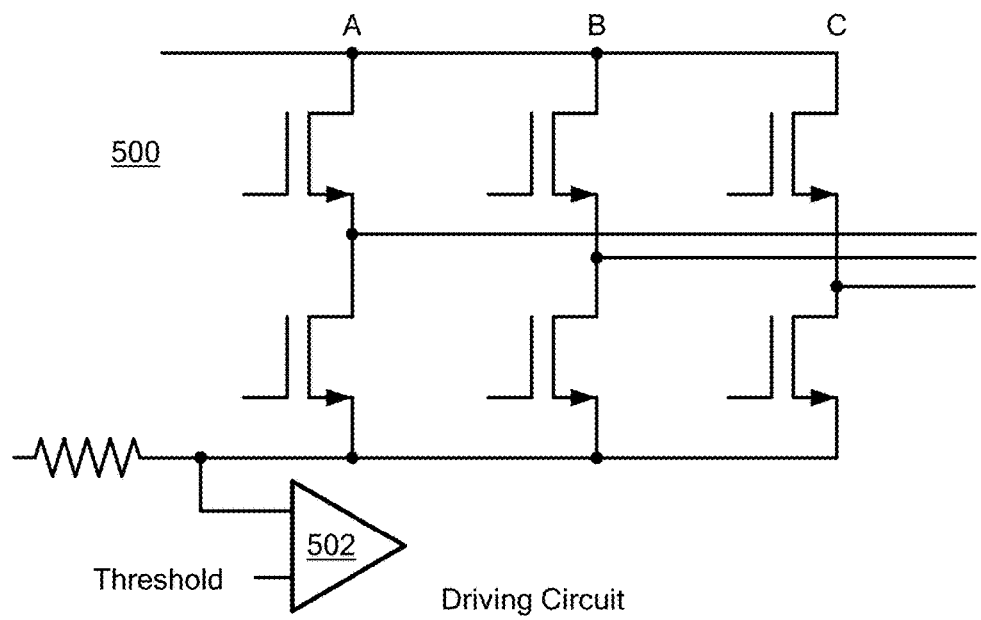
FIG. 5A is a schematic representation of switching elements that can provide polar axis current injection and a comparator.
Figure 5B:
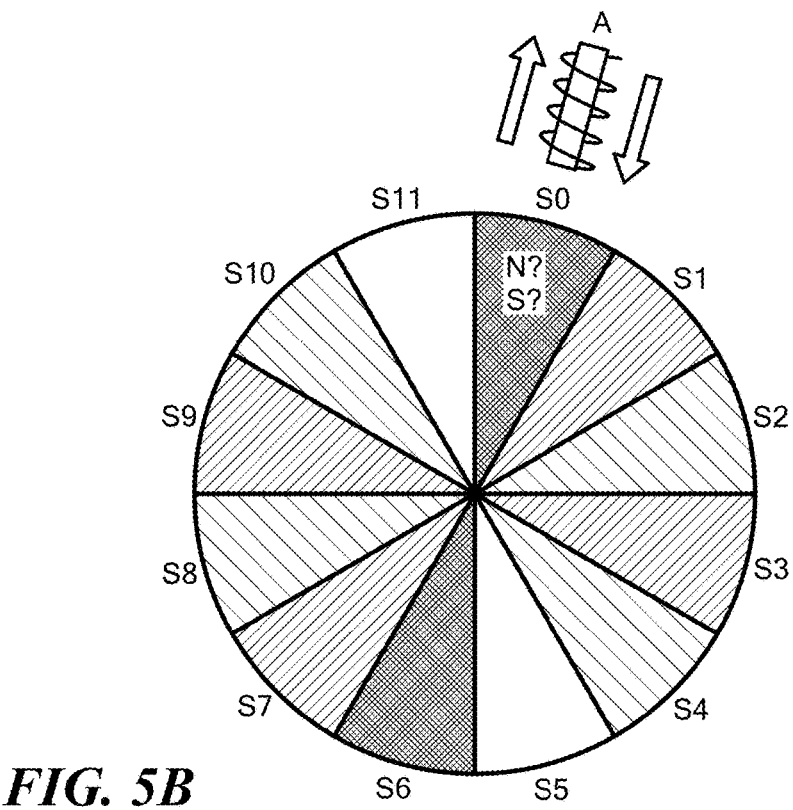
FIG. 5B is a schematic representation of a sector corresponding to a north or south pole aligned with a phase of a motor.

FIG. 5A shows a polar axis current injection circuit 500 and a comparator 502 having a first input as a threshold and a second input as a drive current. FIG. 5B shows a location of the rotor N (or S) pole in relation to a phase, such as phase A, as within one of first and second sectors S0, S6, which can span 30 degrees, where the first and second sectors S0, S6 are 180 degrees apart from each other. A current can be driven towards the two possible locations (sectors S0, S6). One of the currents will reach the threshold of the comparator 502 first. The current to reach the threshold at the comparator 502 faster corresponds to the rotor aligned with the magnet N pole since saturation is achieved earlier due to the alignment with the N pole.

Figure 6:
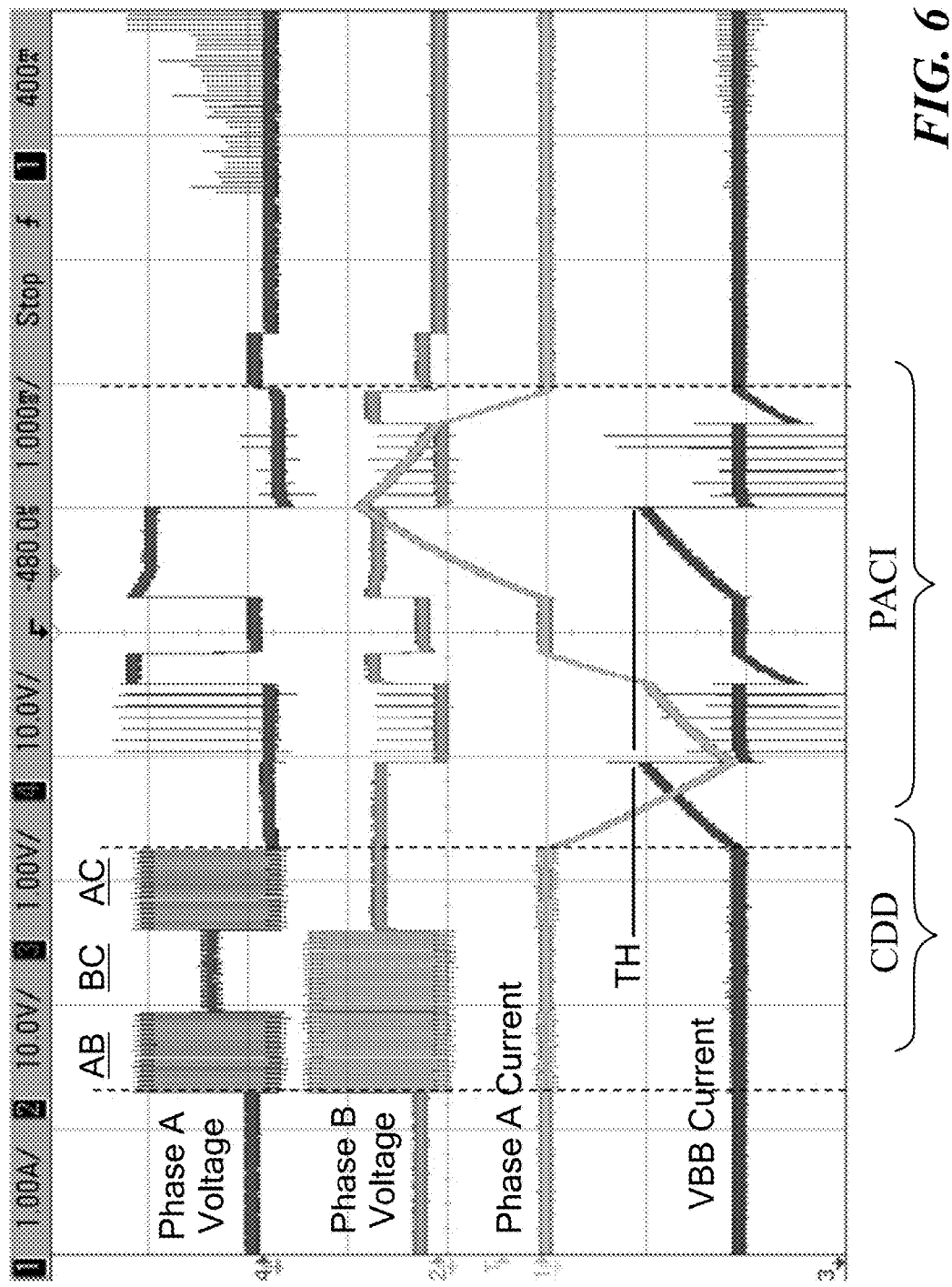
FIG. 6 is a waveform diagram of signals for complementary drive and detect (CDD) motor position.

FIG. 6 shows example waveforms for implementing complementary drive and detect (CDD) and polar axis current injection (PACI) in accordance with illustrative embodiments of the invention. During CDD, in the example waveforms, first phases A and B are driven in complementary fashion, as described above, then phases B and C (phase C voltage is not shown) are driven in a complementary manner, and then phases A and C, to determine in which of two opposite ones of the twelve sectors the rotor is located. In the illustrated example, during the AB portion of CDD, phase C is floating and phase A and phase B voltages are energized. The phase A voltage waveform comprises a high frequency signal during the AB and AC portions of CDD. The phase B voltage waveform comprises a high frequency signal during the AB and BC portions of CDD. It is understood that substantially zero torque is generated during CDD.

Once CDD is complete, PACI can determine in which of the two sectors identified in CDD the rotor is located. During a first portion of PACI, the phase A current is driven in a first direction until the VBB current reaches a PACI threshold TH. The time for the VBB current to reach the PACI threshold TH is measured. During a second portion of PACI, the phase A current is driven in the opposite direction and the time for the VBB current to reach the PACI threshold TH is measured. The smallest time for VBB to reach the PACI threshold TH corresponds to the sector in which the north pole of the magnet is proximate phase A.

Figure 7A:
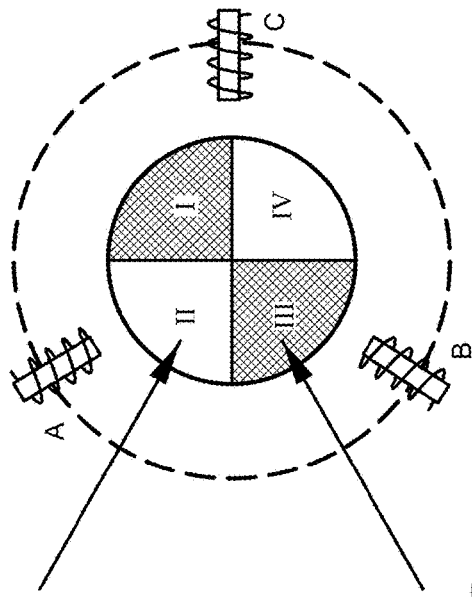
FIG. 7A is a waveform diagram showing further detail of signals in FIG. 6 and a quadrant representation for possible rotor position.
Figure 7B:
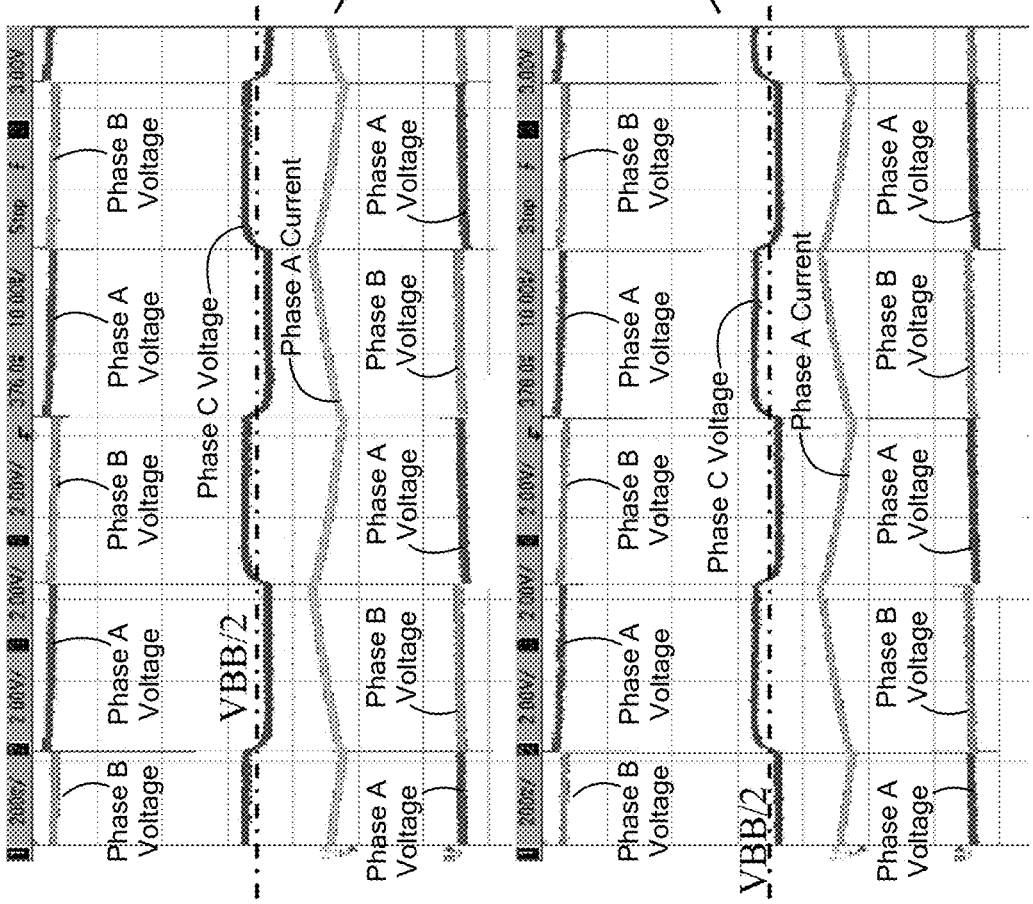
FIG. 7B is a waveform diagram showing further detail of signals in FIG. 6 and a quadrant representation for possible rotor position.

FIGS. 7A and 7B show further detail for CDD in which phase A and B voltages are driven in a complementary manner, as described above. In FIG. 7A, the floating phase C voltage is below VBB/2 when the phase A voltage is high and above VBB/2 when the phase B voltage is high. The phase A current rises when the phase A voltage is high and falls when the phase A voltage is low. In FIG. 7B, the phase C voltage is above VBB/2 when the phase A voltage is high and below VBB/2 when the phase B voltage is high. When phase A is driven high, if Uc>VBB/2, the N pole of the rotor is in quadrant I or III (FIG. 7B). If Uc<VBB/2, then the rotor N pole is located in quadrant II or IV (FIG. 7A).

Figure 8:
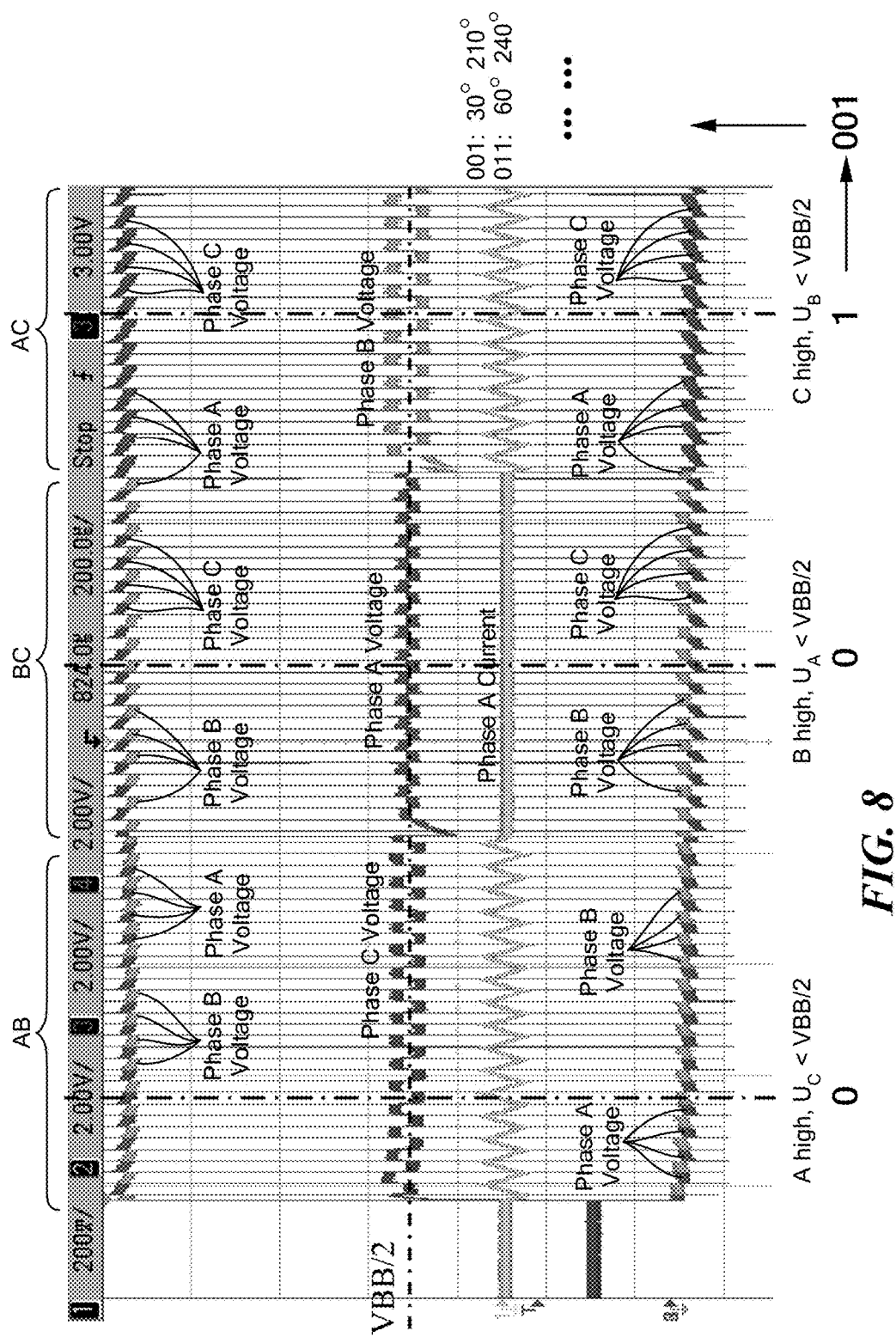
FIG. 8 is a waveform diagram of signals for complementary drive and detect (CDD) to detect motor position.

FIG. 8 shows the phase A, B, and C voltage signals and the phase A current signal for CDD. During a first (AB) portion, the phase A and B voltage signals are complementary, and the phase C voltages is floating, as described above. During a second (BC) portion of CDD, the phase B and C voltage signals are driven in a complementary manner and the phase A signal is floating. During a third (AC) portion of CDD, the phase A and C voltage signals are driven in a complementary manner and the phase B voltage signal is floating. As described above, the floating signal during each CDD portion can be compared to a threshold, such as VBB/2.

In the illustrated waveform diagram, during the AB CDD portion when the phase A voltage is high, it can be seen that Uc<VBB/2, encoded as 0. Similarly, during the BC portion while the phase B voltage is high, $U_A$<VBB/2 encoded as 0, and during the AC portion while the phase C voltage is high, $U_B$>VBB/2 encoded as 1. In embodiments, a floating voltage less than VBB/2 can be encoded a logical "0" and a floating voltage greater than VBB/2 can be encoded a logical "1." In the illustrated example, Uc<VBB/2, $U_A$<VBB/2, and $U_B$>VBB/2 corresponds to "001," where a six row lookup table can be used to check the rotor position in terms of degree. Table 1 below is example look up table. For the example of FIG. 8, code 001 corresponds to a rotor location in sectors at 30 degrees or 210 degrees in relation to the position of phase A.

TABLE 1

| | |
|---|---|
| 001 | 30 or 210 |
| 011 | 60 or 240 |
| 010 | 90 or 270 |
| 110 | 120 or 300 |

TABLE 1-continued

| | |
|---|---|
| 100 | 150 or 330 |
| 101 | 180 or 0 |

Figure 9:
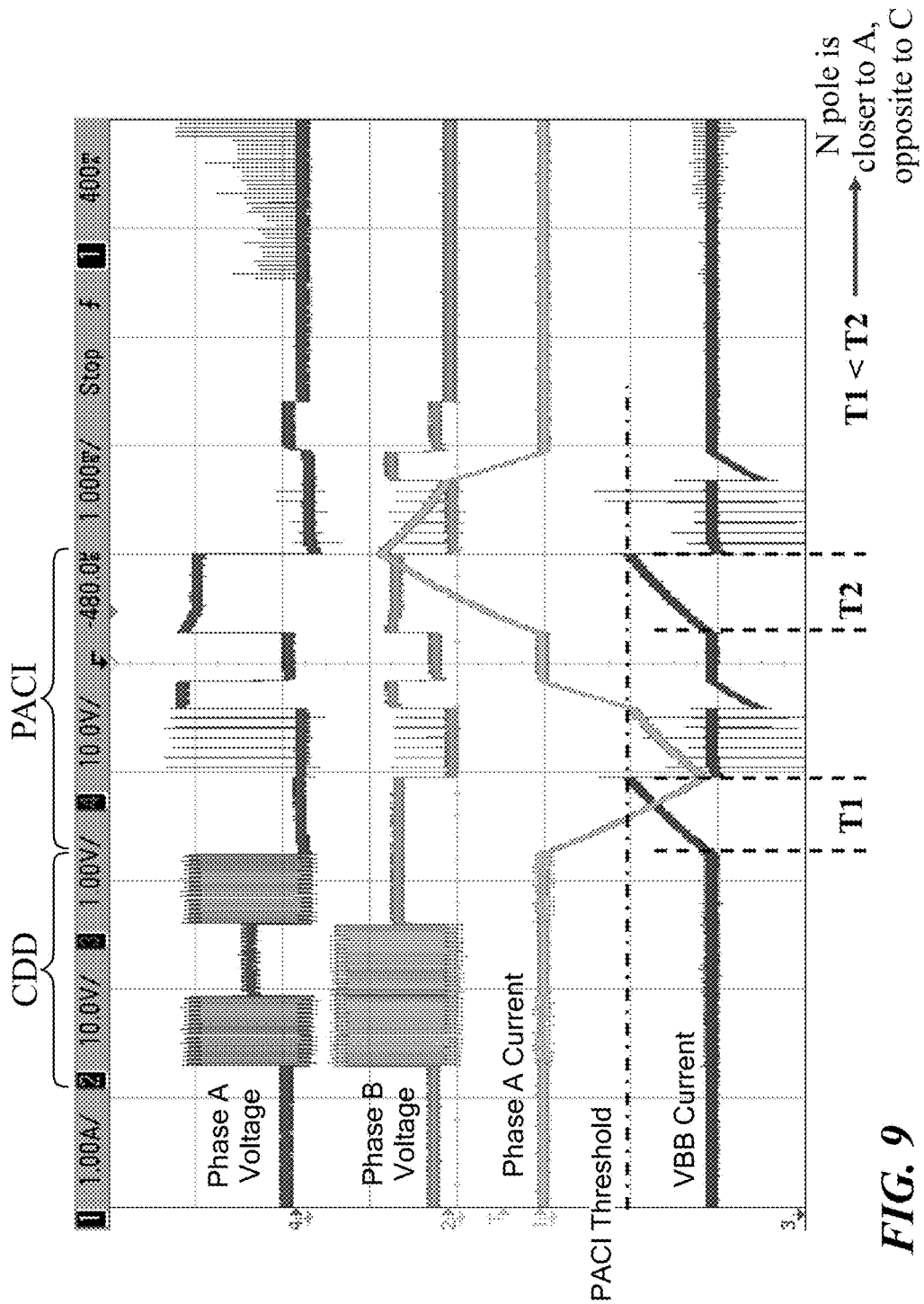
FIG. 9 is a waveform diagram of signals for polar axis current injection to determine motor position after CDD.

FIG. 9 shows example waveforms for PACI after the CDD waveforms in FIG. 8. The phase C (not shown) is driven high and phase A is driven low and phase A current is falling, and at the same time phase C current (not shown) is rising. The VBB current increases until reaching a PACI threshold. The time for the VBB current to reach the PACI threshold is time T1. After the current settles to the default level, the phase A voltage is driven high and phase C is driven low, the phase A current is the opposite as before, e.g., rising, VBB current increases until reaching the PACI threshold at time T2. In the illustrated embodiment, T1<T2, which indicates that the N pole is closer to phase A and opposite to phase C.

Figure 10:
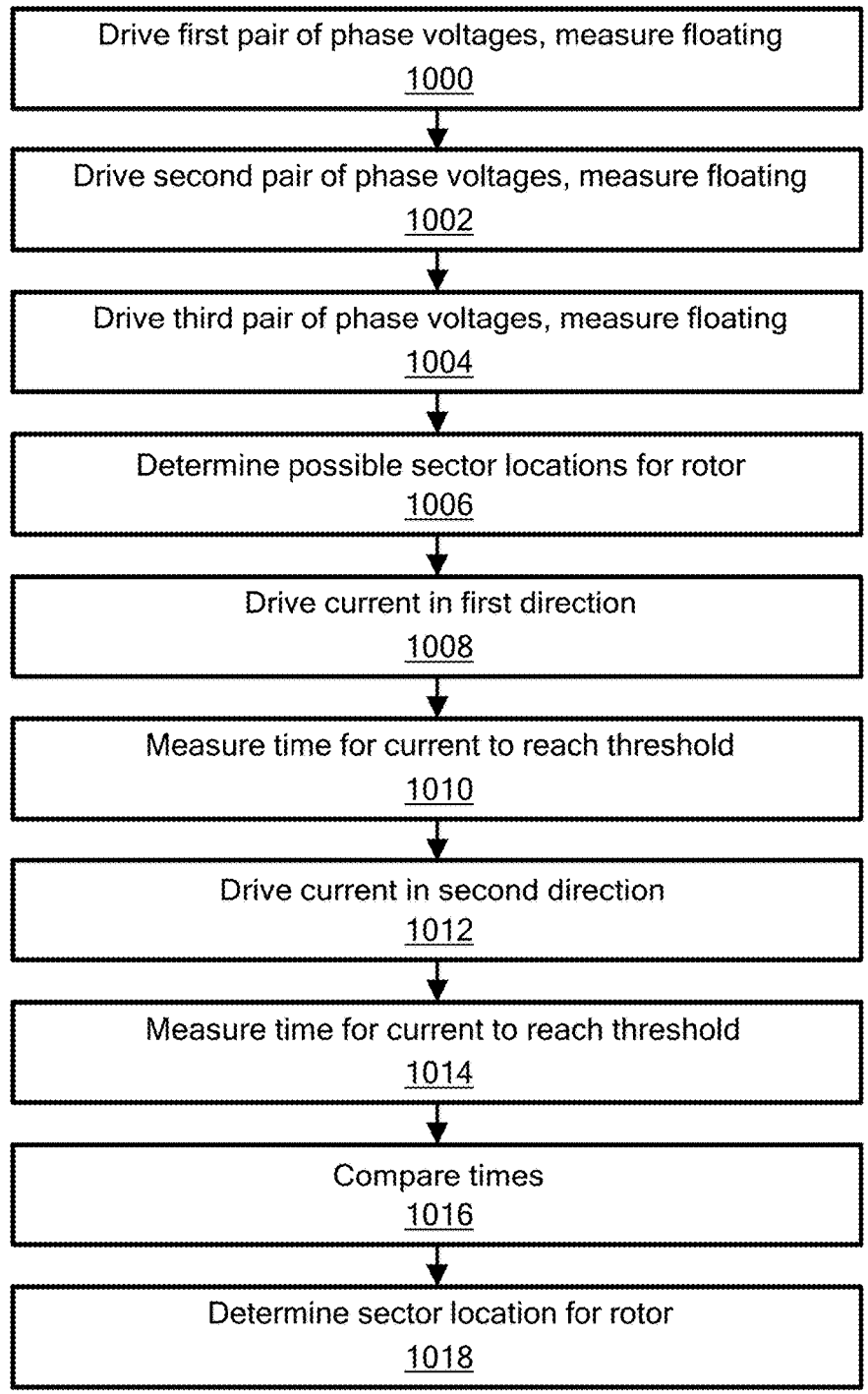
FIG. 10 is a flow diagram of an example sequence of steps for determining motor position.

FIG. 10 shows an illustrative sequence of steps for determining motor position in accordance with example embodiments of the invention. In step 1000, a first pair of phase voltages in a three phase motor is driven in a complementary manner while the other the phase voltages is floating and monitored. In step 1002, a second pair of the phase voltages is driven in complementary manner while the other of the phase voltages is floating and monitored. In step 1004, the third pair of phase voltages is driven in a complementary manner while the other of the phase voltages is floating and monitored. In step 1006, the position of the rotor is determined to be within two of a plurality of sectors. In embodiments, the two possible sector locations for the rotors are 180 degrees part. In step 1008, a first current is driven in a first direction corresponding to a first one of the two possible sector locations. In step 1010, a first time for a current of the floating phase to reach a threshold is determined. In step 1012, a second current is driven in a direction corresponding to the other of the two possible sector locations. In step 1014, a second time for a current of the floating phase to reach a threshold is determined. In step 1016, the first time and the second time are compared to each other. In step 1018, the sector location of the rotor is determined from whether the first or second times was less. As described above, the current taking less time to reach the threshold corresponds to alignment with N pole of the rotor due to earlier saturation.

Illustrative embodiments of the invention may provide advantages over conventional motor position techniques. For example, example embodiments are relatively quiet and fast without generating any significant acoustic noise or vibration because relatively high frequency signals, e.g., 25 kHz, are used. High frequency signals also decrease the time needed for position detection. In addition, in embodiments, the PACI phase conducts two pulses, where conventional IPD requires six pulses, thus generating less torque. In example embodiments, in a worst case scenario there is only 26% (15 degree) of maximum torque with the same amount of current. (sin 15=0.26) Further, higher position resolution, e.g., 30 degrees, is provided as compared to 60 degree resolution of traditional IPD. Also, embodiments of the invention may provide better accuracy since two pulses, which are either aligned to or opposite to the rotor N pole, provide the distinction for inductance saturation. Further, embodiments of the invention may accept larger motor tolerances since the two pulses are applied to the same windings so that the unbalanced motor winding error will be cancelled out.

In another aspect of the invention, motor position is determined to be within a number of sectors after which motor position is modified by applying torque to the motor to move the rotor from the initial position, which is referred to herein as CDD-slight move. In one example, the applied torque moves the rotor 45 degrees or 135 degrees from the initial position. In embodiments, the drive signals that generate the torque are complementary in phase, but not 50% in duty cycle as described above, and floating in the third phase. The asymmetrical nature of the complementary signals generates torque. The voltage on the floating phase can be monitored so that a different floating phase can be evaluated once a zero cross is detected. The rotor position can then be determined from the two possible sector locations.

Figure 11:
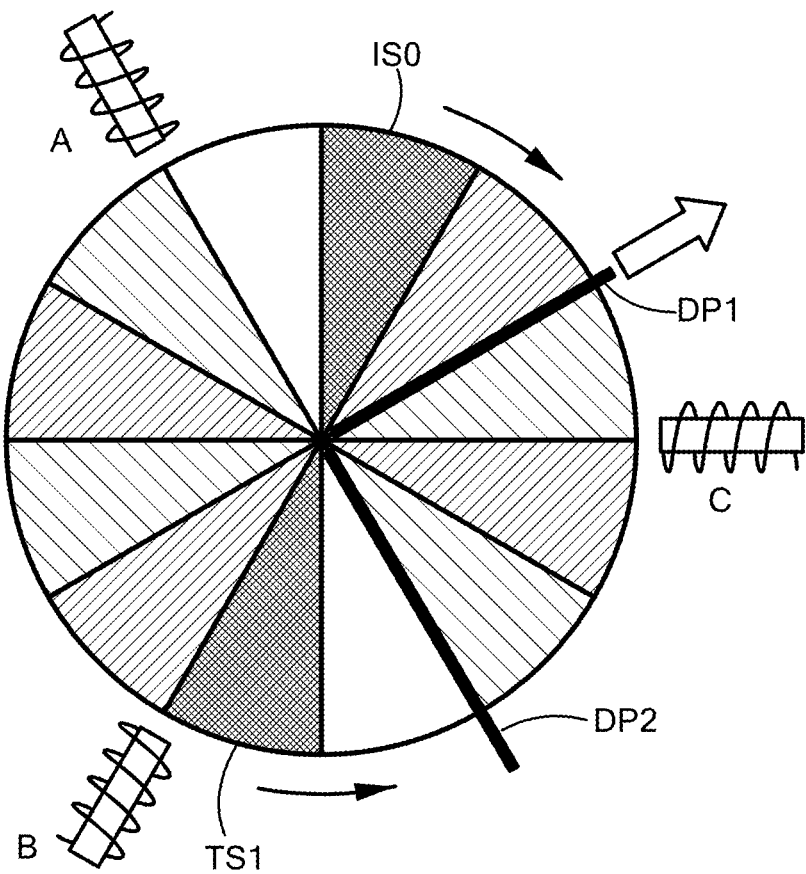
FIG. 11 is a schematic representation of determining motor position including moving the rotor by applying torque from known possible positions.

FIG. 11 shows an example of applying torque to a motor to determine rotor position. In embodiments, CDD is used to identify initial first and second possible sector IS0, IS1 in which the rotor can be located. The rotor position can be slightly moved by driving the motor to a different position. For example, the phase C voltage signal can be driven 55% and the phase B voltage driven at 45% while phase A is floating. As shown in the illustrated example, the motor is driven to the 2 o'clock position DP1. When a comparator output having the floating phase A voltage and VBB/2 as inputs crosses zero, the rotor position is at a first position DP1 or at a second position DP2. In embodiments, the first and second positions DP1, DP2 are 90 degrees apart. As can be seen, if the rotor is initially located in the first possible sector IS0, the rotor is driven to the first position DP1. If the rotor is initially located in the second possible sector IS1, the rotor is driven to the second position DP2. Confirmation of the rotor position can be achieved, for example, by driving phases A and B or phases A and C with complementary signals, as described above. Motor position has been established and quiet and efficient motor startup can begin.

Figure 12:
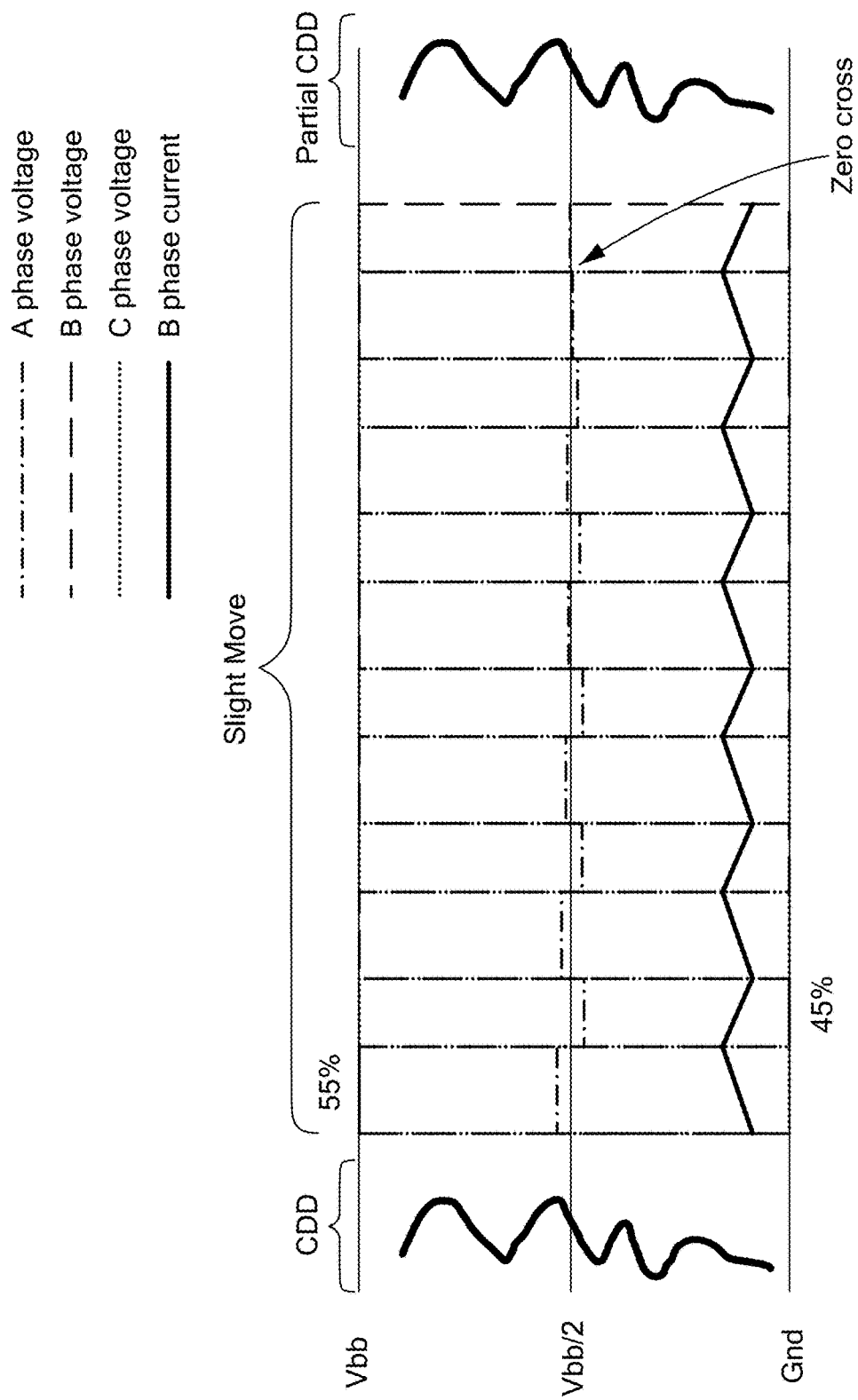
FIG. 12 is a waveform diagram showing signals to determine possible motor positions, apply torque to move the motor, and determine motor position.

FIG. 12 shows 'slight-move' waveforms for phase A voltage, phase B voltage, phase C voltage, and phase B current, wherein A is the floating phase. As can be seen, phase B voltage is driven at a 55% duty cycle. Since phase B and C are complementary, phase C is driven at a 45% duty cycle. During slight move, the average of the phase B current is no longer zero as it has small DC offset, which is how the rotor is driven to move slightly. The floating phase (A phase) voltage envelope gets closer and closer until there is a zero crossing, which corresponds to the location of DP1/DP2 in FIG. 11, for example.

Figure 13:
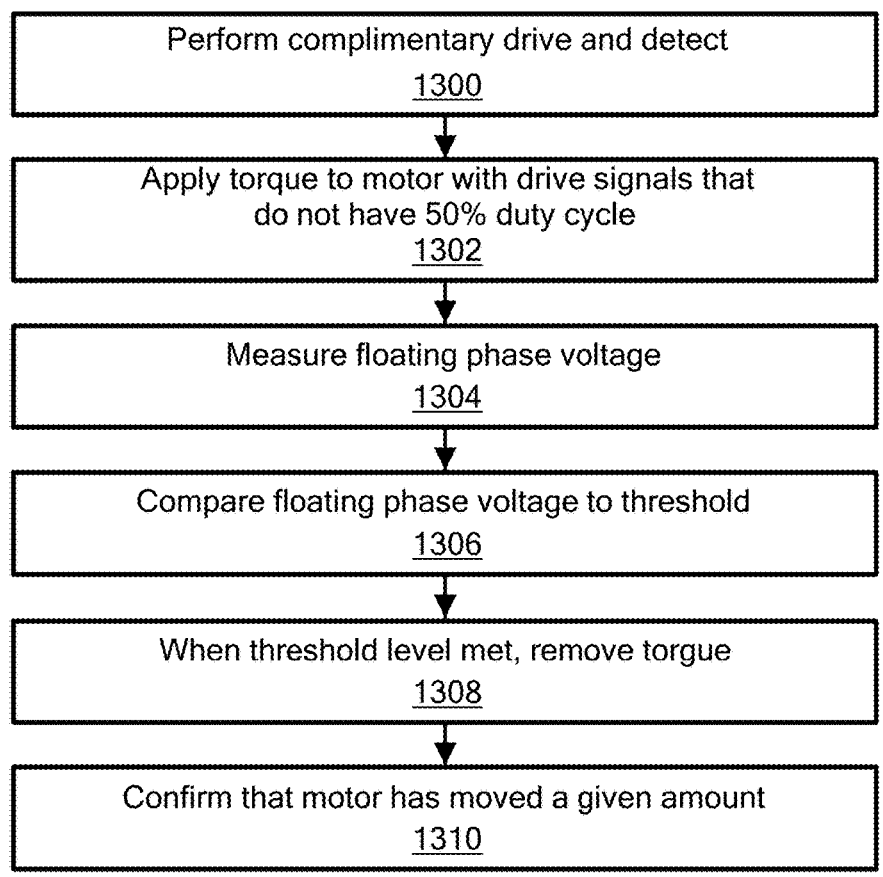
FIG. 13 is a flow diagram of an example sequence of steps for determining possible motor positions, applying torque to move the motor, and determining motor position.

FIG. 13 shows an example sequence of steps to provide CDD-slight move motor position detection in accordance with embodiments. In step 1300, complementary drive and detect (CDD) is performed to determine the location of the motor as being within two sectors, as described above. In step 1302, torque is applied to the motor by drive signals having a duty cycle that is not 50%. For example, the phase C voltage signal is driven at 55%, the B voltage signal is driven at 45%. In step 1304, the voltage of the floating phase is measured. If phase B and C are being driven and phase A is floating, then phase A voltage is measured. In step 1306, the floating phase voltage is monitored. In step 1308, the floating phase voltage is compared to a threshold value. In one embodiment, the phase A voltage, which is floating, is compared to VBB/2. To continue the example, when the floating phase A voltage is less than VBB/2 when the phase C voltage is active, then the motor has moved a given amount, such as 45 degrees. The applied torque is then removed. In optional step 1310, motor position can be confirmed, such as by partial CDD processing, e.g., one phase.

Figure 14:
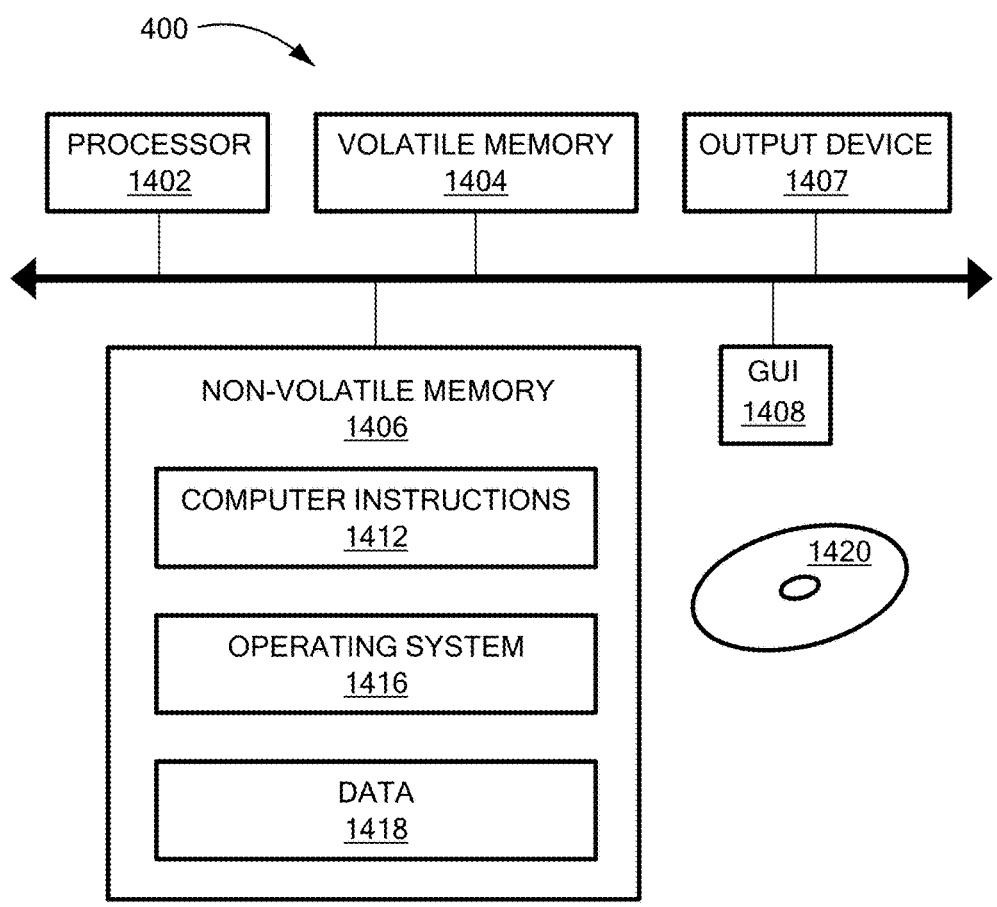
FIG. 14 is a schematic diagram of an example computer that can perform at least a portion of the processing described herein.

FIG. 14 shows an exemplary computer 1400 that can perform at least part of the processing described herein. The computer 1400 includes a processor 1402, a volatile memory 1404, a non-volatile memory 1406 (e.g., hard disk), an output device 1407 and a graphical user interface (GUI) 1408 (e.g., a mouse, a keyboard, a display, for example). The non-volatile memory 1406 stores computer instructions 1412, an operating system 1416 and data 1418. In one example, the computer instructions 1412 are executed by the processor 1402 out of volatile memory 1404. In one embodiment, an article 1420 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method of determining a position of a rotor in a three-phase motor having phase A, phase B, and phase C, comprising:
   determining first and second ones of sectors in which a first one of the magnetic poles of the rotor may be positioned, wherein the first and second ones of the sectors are oppositely located, by driving phase pairs A-B, A-C, and B-C with complementary signals and examining a voltage of a floating one of the phases in relation to a proportion of a supply voltage to a motor controller for controlling the motor; and
   driving first and second currents towards the first and second ones of the sectors and analyzing a time for each of the first and second currents to reach a threshold to identify which of the first and second ones of the sectors is aligned with the first one of the magnetic poles of the rotor.

2. The method according to claim 1, wherein the time corresponds to a level of inductance saturation.

3. The method according to claim 1, wherein the motor comprises BLDC motor.

4. The method according to claim 1, wherein the sectors comprise twelve sectors.

5. The method according to claim 1, wherein the first and second ones of the sectors span about thirty degrees.

6. The method according to claim 1, further including driving phase pairs A-B, A-C, and B-C with complementary signals with about fifty percent duty cycles.

7. The method according to claim 1, wherein substantially zero torque is generated by the driving of phase pairs A-B, A-C, and B-C with complementary signals.

8. The method according to claim 1, further including driving the first current in a first direction and driving the second current in a second direction which is opposite to the first direction.

9. The method according to claim 1, further encoding outputs of comparisons of the respective floating voltages and a voltage threshold during the driving of phase pairs A-B, A-C, and B-C with complementary signals.

10. The method according to claim 9, further including determining the first and second ones of the sectors in which a first one of the magnetic poles of the rotor may be positioned from the encoded outputs.

11. The method according to claim 1, wherein the proportion of the supply voltage is one-half.

12. A system for determining position of a rotor of a three-phase motor, comprising:
   a first module to generate drive signals for the three-phase motor;
   a second module configured to determine first and second ones of sectors in which a first one of the magnetic poles of the rotor may be positioned, wherein the first and second ones of the sectors are oppositely located, by driving phase pairs A-B, A-C, and B-C with complementary signals and examining a voltage of a floating one of the phases in relation to a proportion of a supply voltage to a motor controller for controlling the motor; and
   a third module configured to generate signals to drive first and second currents towards the first and second ones of the sectors and analyze a time for each of the first and second currents to reach a threshold to identify which of the first and second ones of the sectors is aligned with the first one of the magnetic poles of the rotor.

13. The system according to claim 12, wherein the system comprises an IC package having first, second, and third outputs for providing the drive signals for each of the three phases.

14. The system according to claim 12, wherein the time corresponds to a level of inductance saturation.

15. The system according to claim 12, wherein the motor comprises BLDC motor.

16. The system according to claim 12, wherein the sectors comprise twelve sectors.

17. The system according to claim 12, wherein the first and second ones of the sectors span about thirty degrees.

18. The system according to claim 12, wherein the system is further configured to drive phase pairs A-B, A-C, and B-C with complementary signals with about fifty percent duty cycles.

19. The system according to claim 12, wherein substantially zero torque is generated by the driving of phase pairs A-B, A-C, and B-C with complementary signals.

20. The system according to claim 12, wherein the system is further configured to drive the first current in a first direction and driving the second current in a second direction which is opposite to the first direction.

21. The system according to claim 12, wherein the system is further configured to encode outputs of comparisons of the respective floating voltages and a voltage threshold during the driving of phase pairs A-B, A-C, and B-C with complementary signals.

22. The system according to claim 21, wherein the system is further configured to determine the first and second ones of the sectors in which a first one of the magnetic poles of the rotor may be positioned from the encoded outputs.

23. The system according to claim 12, wherein the proportion of the supply voltage is one-half.

* * * * *

UNITED STATES PATENT AND TRADEMARK OFFICE
CERTIFICATE OF CORRECTION

PATENT NO. : 10,181,810 B2
APPLICATION NO. : 15/184159
DATED : January 15, 2019
INVENTOR(S) : Yisong Lu et al.

Page 1 of 1

It is certified that error appears in the above-identified patent and that said Letters Patent is hereby corrected as shown below:

In the Drawings

Sheet 12, FIG. 11, the reference numeral "TS1" is deleted and replaced with --IS1--.

Signed and Sealed this
Nineteenth Day of March, 2019

Andrei Iancu
*Director of the United States Patent and Trademark Office*